(12) United States Patent
Chen et al.

(10) Patent No.: US 8,656,205 B2
(45) Date of Patent: Feb. 18, 2014

(54) GENERATING REFERENCE CLOCKS IN USB DEVICE BY SELECTING CONTROL SIGNAL TO OSCILLATOR FORM PLURAL CALIBRATION UNITS

(75) Inventors: Chun-Liang Chen, Hsinchu (TW); Yi-Le Yang, Hsinchu (TW); Yu-Cheng Lo, Taichung (TW)

(73) Assignee: JMicron Technology Corp., Science-Based Industrial Park, Hsin-Chu (TW)

( * ) Notice: Subject to any disclaimer, the term of this patent is extended or adjusted under 35 U.S.C. 154(b) by 603 days.

(21) Appl. No.: 13/007,663

(22) Filed: Jan. 16, 2011

(65) Prior Publication Data

US 2012/0084594 A1     Apr. 5, 2012

Related U.S. Application Data

(60) Provisional application No. 61/389,283, filed on Oct. 4, 2010.

(51) Int. Cl.
*G06F 1/06*     (2006.01)

(52) U.S. Cl.
USPC .................. 713/501; 713/500; 713/600

(58) Field of Classification Search
None
See application file for complete search history.

(56) References Cited

U.S. PATENT DOCUMENTS

| | | | |
|---|---|---|---|
| 8,407,508 B2* | 3/2013 | Lee et al. | 713/400 |
| 8,427,219 B1* | 4/2013 | Wu et al. | 327/291 |
| 2012/0002764 A1* | 1/2012 | Hsiao et al. | 375/344 |

* cited by examiner

*Primary Examiner* — Kenneth Kim
(74) *Attorney, Agent, or Firm* — Winston Hsu; Scott Margo (57) ABSTRACT

A USB device with a clock calibration function and a method for calibrating reference clocks of a USB device are provided. A USB 2.0 initial calibration is performed on the USB device in order to control an embedded oscillator (EMOSC) of the USB device to output a first reference clock compliance USB 2.0 specification and USB 3.0 specification during the initialization phase. After that, a USB 3.0 on-line calibration is performed on the USB device in order to control the EMOSC of the USB device to calibrate a second reference clock during a super-speed mode of USB 3.0 specification.

19 Claims, 6 Drawing Sheets

GENERATING REFERENCE CLOCKS IN USB DEVICE BY SELECTING CONTROL SIGNAL TO OSCILLATOR FORM PLURAL CALIBRATION UNITS

CROSS-REFERENCE TO RELATED APPLICATIONS

The present application claims the benefit of priority from U.S. Provisional Patent Application No. 61/389,283, filed on Oct. 4, 2010, which is hereby incorporated by reference as if set forth in full in this document for all purposes.

BACKGROUND OF THE INVENTION

1. Field of the Invention

The present invention relates to a USB device, and more particularly, to a USB device with a clock calibration function and a method for calibrating reference clocks of the USB device.

2. Description of the Prior Art

Universal Serial Bus (USB) is a standard for peripheral devices. It began development in 1994 by a group of seven companies: Compaq, DEC, IBM, Intel, Microsoft, NEC and Nortel. In general, the USB supports the following signaling rates, including: a low-speed mode having a transfer rate of 1.5 Mbits/s being defined by USB 1.0 specification, a full-speed mode having a transfer rate of 12 Mbits/s being the basic USB data rate defined by USB 1.1 specification, a high-speed mode having a transfer rate of 480 Mbits/s being defined by USB 2.0 specification, and a super-speed mode having a transfer rate of 5.0 Gbits/s being defined by USB 3.0 specification.

Nowadays, an embedded oscillator (EMOSC) is adopted for a USB device operating under the USB high-speed mode (having a transfer rate of 480 Mbits/s) and the USB full-speed mode (having a transfer rate of 12 Mbits/s) only. However, manufacturing process variation, the operating voltage variation and/or the operating temperature variation of the EMOSC usually result in a clock drift in the clock frequency of the EMOSC. During the initialization phase, a large clock drift may occur in the clock frequency of the EMOSC since the operating voltage and the operating temperature of the EMOSC cannot be obtained. In addition, the super-speed mode of USB 3.0 specification has a smaller clock drift tolerance than the full-speed mode and the high-speed mode of the USB 2.0 specification. For example, clock tolerance is 5.0 Gbits/s±300 ppm for the super-speed mode of USB 3.0 specification, while the clock tolerance is 480 Mbits/s±500 ppm for the high-speed mode of the USB 2.0 specification and 12.000 Mbits/s±2500 ppm for the full-speed mode of the USB 2.0 specification. When the EMOSC is employed for calibrating the reference clock of the USB device during the super-speed mode of USB 3.0 specification (5.0 Gbits/s), it may result in abnormal operations under USB 3.0 mode if the operating frequency of the reference clock is inaccurate and unstable during the initialization phase.

Hence, how to precisely and stably calibrate the reference clock of the USB device during different transfer modes (such as, the full-speed mode, the high-speed mode and the super-speed mode) has become an important topic for designers in this field.

SUMMARY OF THE INVENTION

It is one of the objectives of the claimed invention to provide a USB device with a clock calibration function and a related method for calibrating reference clocks of the USB device to solve the abovementioned problems.

According to an exemplary embodiment of the present invention, a USB device with a clock calibration function is provided. The USB device includes a first controller, a second controller, a calibration circuit, a selecting circuit, and an embedded oscillator (EMOSC). The first controller is arranged to generate a first operating clock according to a first reference clock. The second controller is arranged to generate a second operating clock according to a second reference clock. The calibration circuit may include a first calibration unit and a second calibration unit. The first calibration unit is coupled to the first controller, and arranged to generate a first control signal according to the first operating clock. The second calibration unit is coupled to the second controller, and arranged to generate a second control signal according to the second operating clock. The selecting circuit is coupled to the first calibration unit and the second calibration unit, and arranged to select a target control signal from the first control signal and the second control signal. The EMOSC is coupled to the selecting circuit, the first controller, and the second controller, and is arranged to output the first reference clock to the first controller or output the second reference clock to the second controller according to the target control signal. During a first phase, a first calibration is performed on the USB device via the first calibration unit in order to control the EMOSC to output the first reference clock to the first controller. During a second phase, a second calibration is performed on the USB device via the second calibration unit in order to control the EMOSC to output the second reference clock to the second controller.

According to one embodiment, an USB 2.0 initial calibration is performed on the USB device in order to control the EMOSC of the USB device to output a reference clock compliance USB 2.0 specification and USB 3.0 specification during the initialization phase.

According to another embodiment, an USB 3.0 on-line calibration is performed on the USB device in order to control the EMOSC of the USB device to calibrate the reference clock during a super-speed mode of USB 3.0 specification.

According to still another embodiment, amass production (MP) calibration is performed on the USB device in order to maintain a reference clock of the USB within a predetermined frequency range.

In one exemplary design, a start of frame (SOF) packet may be adopted for calibrating the reference clock of the USB device during the initialization phase.

In another exemplary design, an isochronous timestamp (ITP) packet may be adopted for calibrating the reference clock of the USB device during the super-speed mode of the USB 3.0 specification.

According to another exemplary embodiment of the present invention, a method for calibrating reference clocks of a USB device is provided. The method includes the following steps: using a first controller to generate a first operating clock according to a first reference clock; using a second controller to generate a second operating clock according to a second reference clock; generating a first control signal according to the first operating clock; generating a second control signal according to the second operating clock; selecting a target control signal from the first control signal and the second control signal; using an embedded oscillator (EMOSC) to output the first reference clock to the first controller or output the second reference clock to the second controller according to the target control signal; during a first phase, performing a first calibration on the USB device in order to control the EMOSC to output the first reference clock to the first controller; and during a second phase, performing a second calibration on the USB device in order to control the EMOSC to output the second reference clock to the second controller.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
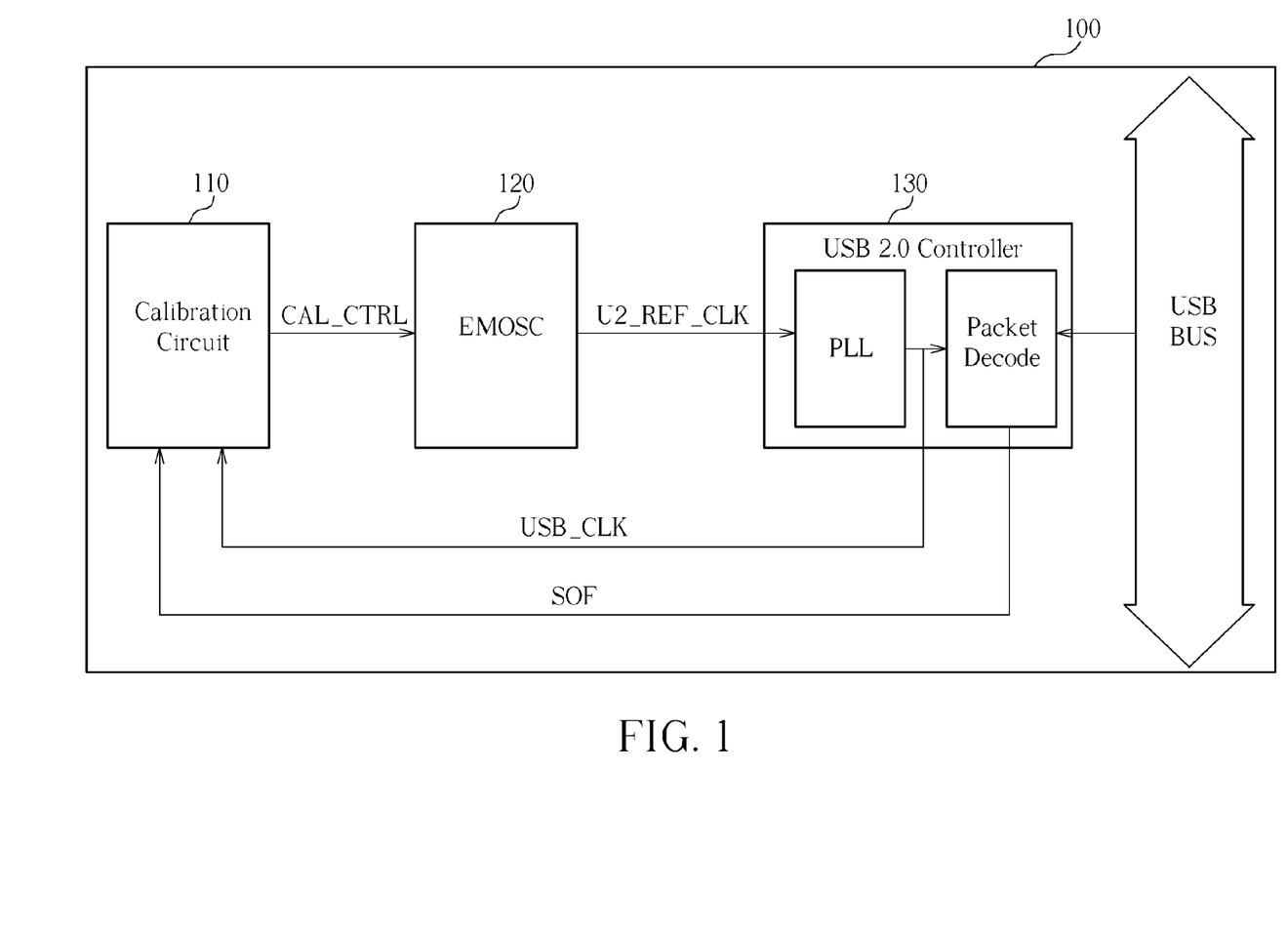
FIG. 1 is a block diagram illustrating a conventional USB device.

Please refer to FIG. 1. FIG. 1 is a block diagram illustrating a conventional USB device 100. As shown in FIG. 1, the conventional USB device 100 may include a calibration circuit 110, an embedded oscillator (EMOSC) 120, and a USB 2.0 controller 130. The calibration circuit 110 is coupled to the EMOSC 120 and the USB 2.0 controller 130, and may be arranged to generate a control signal CAL_CTRL according to an operating signal USB_CLK. The conventional EMOSC 120 is coupled between the calibration circuit 110 and the USB 2.0 controller, and may be adopted for outputting and calibrating a reference clock U2_REF_CLK to the USB 2.0 controller 130 of the USB device 100 according to the control signal CAL_CTRL. After that, the USB 2.0 controller 130 may generate the operating clock USB_CLK according to the reference clock U2_REF_CLK. Be noted that the conventional EMOSC 120 can be only applied to USB 2.0 transfer mode, such as the high-speed mode (having a transfer rate of 480 Mbits/s) or the full-speed mode (having a transfer rate of 12 Mbits/s) since each of the full-speed mode and the high-speed mode of the USB 2.0 specification has a larger clock drift tolerance.

As shown in the following Table-1, the USB device 100 operating under USB 2.0 mode can be correctly identified within the frequency range from 11.7 MHz to 12.3 MHz for the high-speed mode. As a result, the reference clock U2_REF_CLK of the EMOSC 120 can be easily calibrated via the calibration circuit 110 within the frequency range from 11.7 MHz to 12.3 MHz for the high-speed mode.

TABLE 1-1

| | USB High Speed (480 Mbits/s) | | | | | | | | | |
|---|---|---|---|---|---|---|---|---|---|---|
| | USB Reference Clock (MHz) | | | | | | | | | |
| | 11.5 | 11.6 | 11.7 | 11.8 | 11.9 | 12.0 | 12.1 | 12.2 | 12.3 | 12.4 |
| USB device Connection | Fail | Fail | OK | OK | OK | OK | OK | OK | OK | Fail |

However, the super-speed mode of USB 3.0 specification, especially during the initialization phase, has a smaller clock drift tolerance than the full-speed mode and the high-speed mode of the USB 2.0 specification. When the conventional EMOSC 120 is employed for calibrating the reference clock (i.e., U3_REF_CLK) of the USB device during the super-speed mode of USB 3.0 specification (5.0 Gbits/s), it may result in abnormal operations under USB 3.0 mode if the operating frequency of the reference clock is inaccurate and unstable during the initialization phase. In other words, the conventional EMOSC design cannot directly be applied to the USB 3.0 transfer mode.

Figure 2:
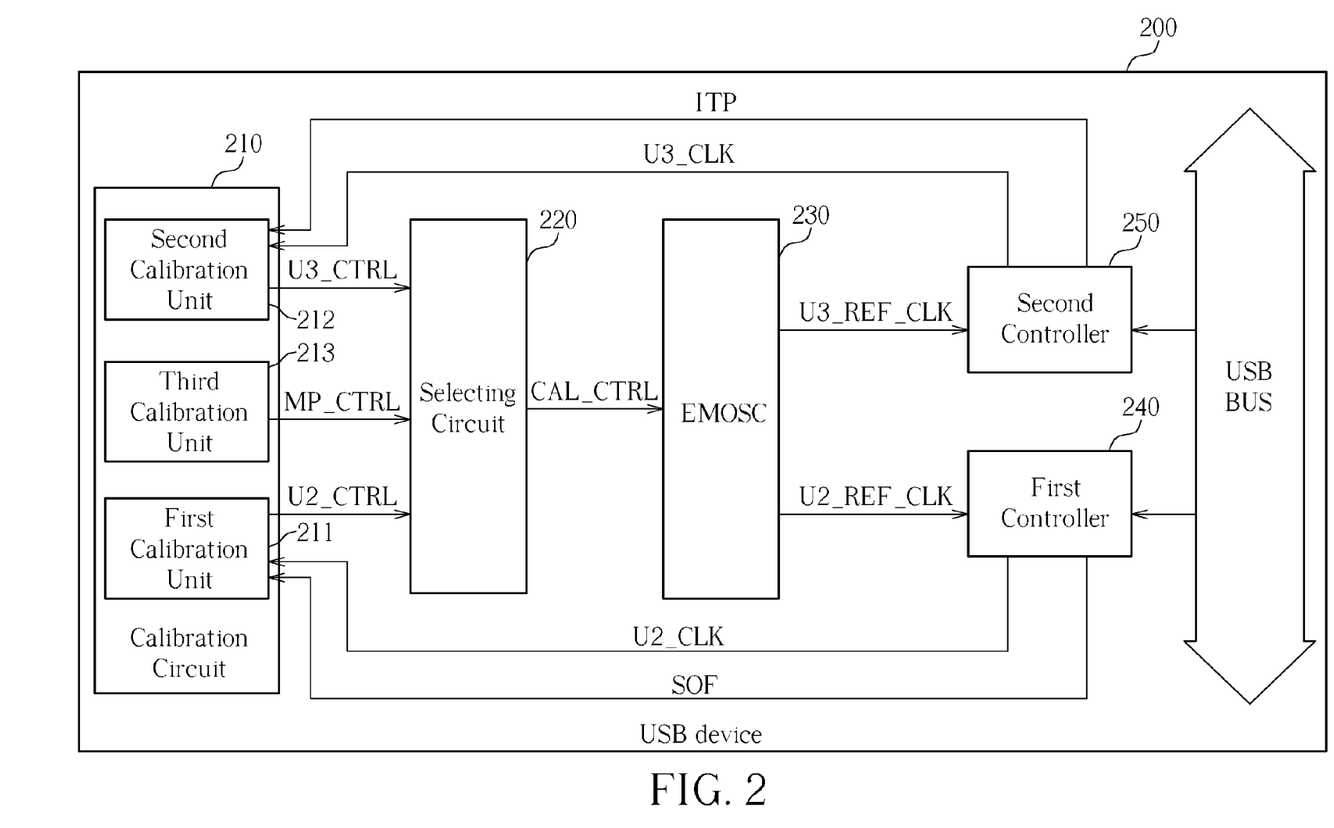
FIG. 2 is a block diagram illustrating a proposed USB device with a clock calibration function according to a first embodiment of the present disclosure.

Please refer to FIG. 2. FIG. 2 is a block diagram illustrating a proposed USB device 200 with a clock calibration function according to a first embodiment of the present disclosure. As shown in FIG. 2, the USB device 200 may include a calibration circuit 210, a selecting circuit 220, an embedded oscillator (EMOSC) 230, a first controller 240, and a second controller 250. In this embodiment, the calibration circuit 210 may include a first calibration unit 211, a second calibration unit 212, and a third calibration unit 213. The first calibration unit 211 is coupled to the first controller 240 and the selecting circuit 220, and may be arranged to generate a first control signal U2_CTRL according to a first operating clock U2_CLK. The second calibration unit 212 is coupled the second controller 250 and the selecting circuit 220, and may be arranged to generate a second control signal U3_CTRL according to a second operating clock U3_CLK. The third calibration unit 213 is coupled to the selecting circuit 220, and may be arranged to generate a third control signal MP_CTRL. The selecting circuit 220 is arranged to select a target control signal CAL_CTRL from the first control signal U2_CTRL, the second control signal U3_CTRL, and the third control signal MP_CTRL. Furthermore, the EMOSC 230 is coupled to the selecting circuit 220, the first controller 240, and the second controller 250, and may be arranged to output the first reference clock U2_REF_CLK to the first controller 240 or output the second reference clock U3_REF_CLK to the second controller 250 according to the target control signal CAL_CTRL. After that, the first controller 240 is coupled to the EMOSC 230 and the first calibration unit 211, and may be arranged to generate the first operating clock U2_CLK according to the first reference clock U2_REF_CLK; and the second controller 250 is coupled to the EMOSC 230 and the second calibration unit 212, and may be arranged to generate the second operating clock U3_CLK according to the second reference clock U3_REF_CLK.

In this embodiment, the USB device 200 adopts the first operating clock U2_CLK when operating under USB 2.0 mode, and adopts the second operating clock U3_CLK when operating under USB 3.0 mode. Hence, the first controller 240 may be implemented by a USB 2.0 controller and the second controller 250 may be implemented by a USB 3.0 controller, but this should not be considered as a limitation of the present disclosure. Furthermore, the selecting circuit 220 may be implemented by a multiplexer, but the present disclosure is not limited to this only.

What calls for special attention is that: during a first phase, a first calibration is performed on the USB device 200 via the first calibration unit 211 in order to control the EMOSC 230 to output the first reference clock U2_CLK to the first controller 240; during a second phase, a second calibration is performed on the USB device 200 via the second calibration unit 212 in order to control the EMOSC 230 to output the second reference clock U3_REF_CLK to the second controller 250; and during a third phase, a third calibration is performed on the USB device 200 via the third calibration unit 213 in order to control the EMOSC 230 to output the first reference clock U2_CLK to the first controller 240 and maintain the first reference clock U2_CLK within a predetermined frequency range.

For example, in one embodiment, the first phase may be an initial phase, and the first calibration may be a USB 2.0 initial calibration. In another embodiment, the second phase may be an on-line phase, and the second calibration may be a USB 3.0 on-line calibration. In still another embodiment, the third phase is a mass production (MP) phase, and the third calibration is a mass production (MP) calibration.

First, a mass production (MP) calibration is performed upon the USB device 200 in order to maintain the reference clock of the USB device 200 within a predetermined frequency range, such as the clock drift range listed in aforementioned Table-1. Second, during the power-on phase, the USB device 200 operates under USB 2.0 mode. Under USB 2.0 mode, an USB 2.0 initial calibration is performed on the USB device 200 in order to control the EMOSC 230 of the USB device 200 to output a reference clock complying with USB 2.0 specification and USB 3.0 specification during the initialization phase. For example, a periodic packet (e.g., a start of frame (SOF) packet) transmitted from an USB host can be adopted for calibrating the reference clock U2_REF_CLK of the USB device 200 during the initialization phase. After performing the initial calibration, the USB device 200 enters USB 3.0 mode. Since the clock of the EMOSC 230 has been accurately calibrated, received packet errors of the USB device 200 can be avoided/mitigated during the USB 3.0 initialization phase. As a result, the USB device 200 can pass USB 3.0 initialization phase and enter USB 3.0 operation state (U0 state) normally. In order to prevent clock drift of the EMOSC clock resulted from temperature variation after long-time transfer during the U0 state, an USB 3.0 on-line calibration can be performed on the USB device 200 in order to control the EMOSC 230 of the USB device 200 to calibrate the reference clock U3_REF_CLK during a super-speed mode of USB 3.0 specification. For example, a periodic packet transmitted from the USB host (i.e., an isochronous timestamp (ITP) packet) may be adopted for calibrating the reference clock of the USB device 200 during the super-speed mode of the USB 3.0 specification in order to solve the problem of packet errors.

Figure 3:
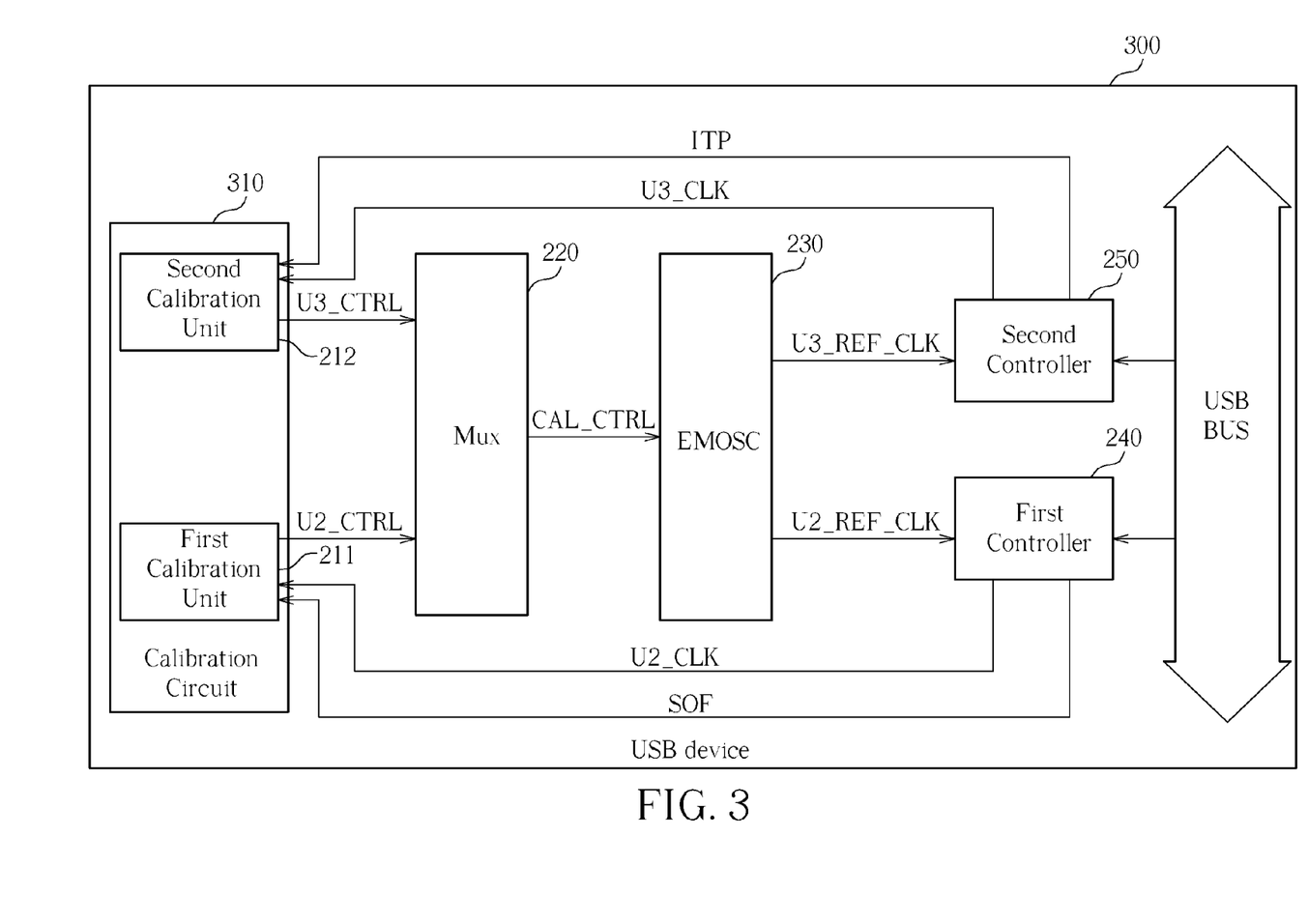
FIG. 3 is a block diagram illustrating a proposed USB device with a clock calibration function according to a second embodiment of the present disclosure.

Please refer to FIG. 3. FIG. 3 is a block diagram illustrating a proposed USB device 300 with a clock calibration function according to a second embodiment of the present disclosure. The architecture of the USB device 300 shown in FIG. 3 is similar to that of the USB device 200 shown in FIG. 2, and the difference between them is that the calibration circuit 310 of the USB device 300 shown in FIG. 3 only includes the first calibration unit 211 and the second calibration unit 212. In other words, the third calibration unit 213 is omitted from the calibration circuit 310, and the third calibration (i.e., the MP calibration) won't be performed on the USB device 300 via the third calibration unit 213. In this embodiment, the USB 2.0 initial calibration is performed on the USB device 300 via the first calibration unit 211 in order to control the EMOSC 230 of the USB device 300 to output a reference clock (i.e., the U2_REF_CLK) complying with USB 2.0 specification and USB 3.0 specification during the initialization phase. After that, the USB 3.0 on-line calibration can be performed on the USB device 300 via the second calibration unit 212 in order to control the EMOSC 230 of the USB device 300 to calibrate the reference clock U3_REF_CLK during a super-speed mode of the USB 3.0 specification.

The abovementioned embodiments are presented merely to illustrate practicable designs of the present disclosure, and in no way should be considered to be limitations of the scope of the present invention. Those skilled in the art should appreciate that various modifications of the USB devices shown in FIG. 2-FIG. 3 may be made without departing from the spirit of the present disclosure.

Figure 4:
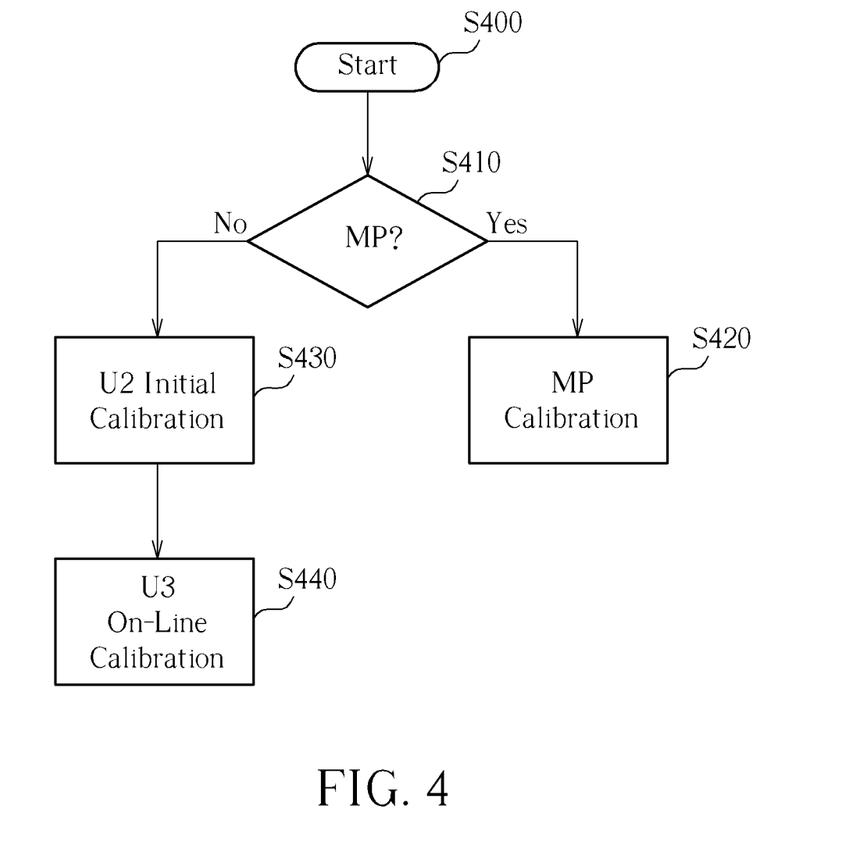
FIG. 4 is a flowchart illustrating a calibration method for calibrating reference clocks of a USB device according to an exemplary embodiment of the present disclosure.

Please refer to FIG. 4. FIG. 4 is a flowchart illustrating a calibration method for calibrating reference clocks of a USB device according to an exemplary embodiment of the present disclosure. The method includes, but is not limited to, the following steps:

Step S400: Start.
Step S410: Determine whether the USB device is under the mass production (MP) mode or not.
If the USB device is under the MP mode, go to step S420; otherwise, go to step S430.
Step S420: Perform the MP calibration on the USB device.
Step S430: Perform the USB 2.0 initial calibration on the USB device.
Step S440: Perform the USB 3.0 on-line calibration on the USB device.

In the step S410 of FIG. 4, the flow first determines whether the USB device is under the MP mode or not. If the USB device is under the MP mode, the flow goes to the step S420 and performs the MP calibration on the USB device 200 in order to maintain a reference clock of the USB device within a predetermined frequency range. On the other hand, if the USB device is not under the MP mode, the flow goes to the step S430 and performs the USB 2.0 initial calibration on the USB device first, and then goes to the step S440 and performs the USB 3.0 on-line calibration on the USB device.

Figure 5:
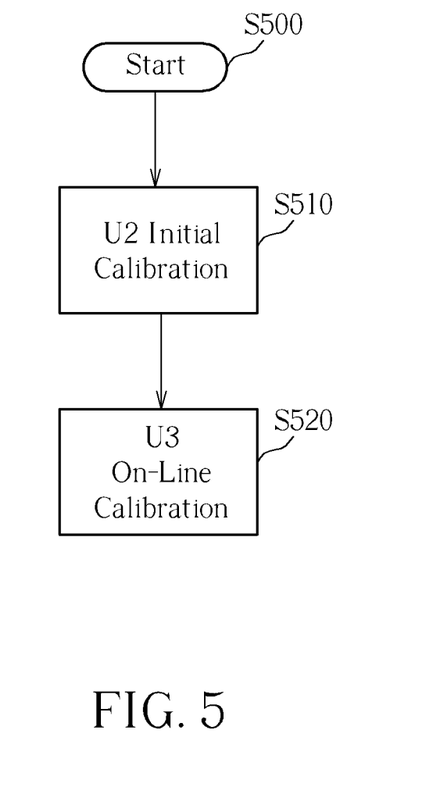
FIG. 5 is a flowchart illustrating a calibration method for calibrating reference clocks of a USB device according to another exemplary embodiment of the present disclosure.

Please refer to FIG. 5. FIG. 5 is a flowchart illustrating a calibration method for calibrating reference clocks of a USB device according to another exemplary embodiment of the present disclosure. The steps of the flowchart shown in FIG. 5 are similar to the steps of the flowchart shown in FIG. 4, and the difference between them is that the flowchart shown in FIG. 5 omits the step of determining whether the USB device is under the MP mode (i.e., the step S410 and the step S420). In this embodiment, the USB 2.0 initial calibration is performed on the USB device in order to control the EMOSC of the USB device to output a reference clock complying with USB 2.0 specification and USB 3.0 specification during the initialization phase (i.e., the step S510). After that, in the step S520, an USB 3.0 on-line calibration can be performed on the USB device in order to control the EMOSC of the USB device to calibrate the reference clock during a super-speed mode of USB 3.0 specification.

Figure 6:
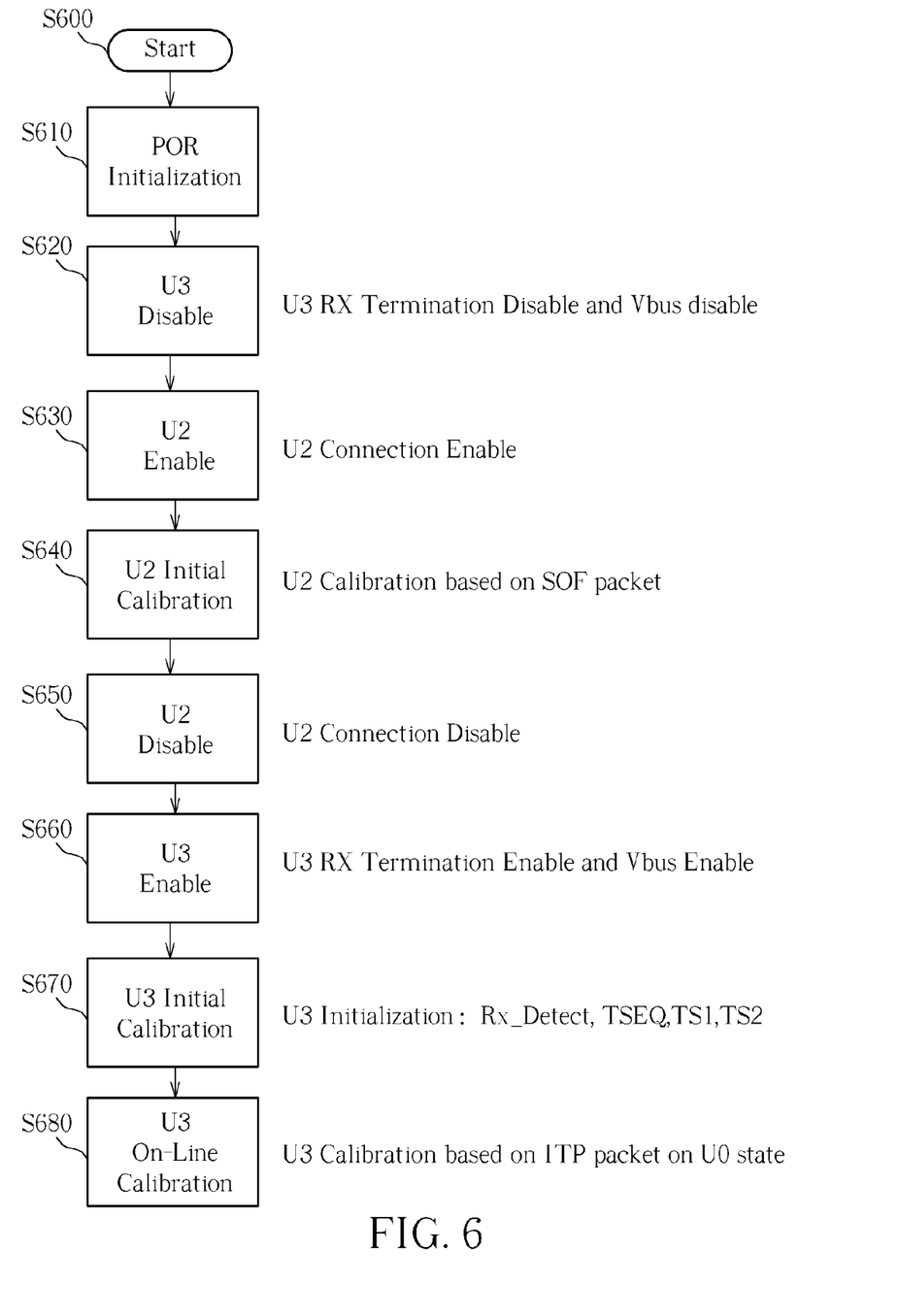
FIG. 6 is a flowchart illustrating detailed steps of the USB 2.0 initial calibration and the USB 3.0 on-line calibration.

Please refer to FIG. 6. FIG. 6 is a flowchart illustrating detailed steps of the USB 2.0 initial calibration and the USB 3.0 on-line calibration. First, in the step S610, when the USB device is connected to the USB port, it enters the POR initialization state. After that, in the step S620, the USB device enters the USB 3.0 disable state in order to disable the USB 3.0 RX termination. In the step S630, the USB device enters the USB 2.0 enable state in order to normally operate under USB 2.0 mode. After that, in the step S640, the USB device enters the USB 2.0 initial calibration state in order to calibrate the reference clock of the EMOSC of the USB device based on SOF packet. After performing the initial calibration upon the reference clock (i.e., U2_REF_CLK) of the EMOSC, the USB device enters the USB 2.0 disable state in order to disable USB 2.0 connections (i.e., the step S650). After that, in the step S660, the USB device enters the USB 3.0 enable state in order to enable USB 3.0 RX termination. After enabling the USB 3.0 RX termination, the USB device enters the USB 3.0 initialization state in order to detect RX termination and perform TSEQ, TS1 and TS2 order sets training (i.e., the step S670). Finally, in the step S680, the USB device enters the USB 3.0 on-line calibration state in order to control the EMOSC of the USB device to calibrate the reference clock (i.e., U3_REF_CLK) based on the ITP packet during U0 state.

How each element operates can be known by collocating the steps shown in FIG. 6 and the elements shown in FIG. 3, and further description is omitted here for brevity.

Please note that, the steps of the abovementioned flowcharts are merely practicable embodiments of the present invention, and in no way should be considered to be limitations of the scope of the present disclosure. The methods can include other intermediate steps or several steps can be merged into a single step without departing from the spirit of the present disclosure.

The abovementioned embodiments are presented merely for describing the features of the present disclosure, and in no way should be considered to be limitations of the scope of the present disclosure. In summary, the exemplary USB device with a clock calibration function and the related calibration method for calibrating reference clocks of a USB device disclosed in the present disclosure focus on the MP calibration, the USB 2.0 initial calibration, as well as the USB 3.0 on-line calibration. The MP calibration is performed on the USB device in order to maintain a reference clock of the USB within a predetermined frequency range. As a result, the follow-up USB 2.0 initial calibration can be performed on the USB device in order to control an embedded oscillator (EMOSC) of the USB device to output a reference clock compliance USB 2.0 specification and USB 3.0 specification during the initialization phase. Be noted that the USB 2.0 initial calibration can be implemented by calibrating the EMOSC clock based on a periodic packet (e.g., the SOF packet) transmitted from the USB host. At first, the SB device operates under the USB 2.0 mode, and then the initial calibration is performed on the reference clock of the EMOSC according to the periodic packet (e.g., the SOF packet). After completing the initial calibration, the USB device enters the USB 3.0 mode. Since the reference clock of the EMOSC has been calibrated already, the USB 3.0 initialization failure caused by large EMOSC clock drift during the USB 3.0 transfer mode can be avoided. In addition, the USB 3.0 on-line calibration is performed on the USB device in order to control the EMOSC of the USB device to calibrate the reference clock based on the periodic packet (e.g., the ITP packet) transmitted from the USB host during a super-speed mode of USB 3.0 specification. This USB 3.0 on-line calibration can prevent clock drift of the EMOSC clock resulted from temperature after long time transfers during the U0 state.

Furthermore, the calibration method for calibrating reference clocks of a USB device disclosed in the present disclosure includes the following advantages/benefits over the conventional design.

(1) Due to the combination of the USB 2.0 initial calibration and the USB 3.0 on-line calibration, the EMOSC design can be applied to the USB 3.0 transfer mode. Since each of the full-speed mode and the high-speed mode of the USB 2.0 specification has a larger clock drift tolerance than the super-speed mode of the USB 3.0 specification, the clock drifts caused by different operating temperatures and different operating voltages can be overcome if the USB 2.0 initial calibration is adopted for calibrating the initial frequency. As a result, the USB device is able to enter the U0 state correctly, and continue to perform the USB 3.0 on-line calibration thereupon.

(2) The periodic packet, such as the ITP packet, of the USB 3.0 specification can be adopted for implementing the USB 3.0 on-line calibration in order to overcome the clock drift caused by the operating voltage variation and/or the operating temperature variation. As a result, bit errors can be avoided.

(3) The EMOSC circuit can be directly applied to the super-speed mode of the USB 3.0 specification without additional analog circuits for compensating the clock drift caused by the operating voltage variation and/or the operating temperature variation. As a result, not only can power requirement be substantially lowered, but also die cost for calibration circuits of the USB device can be reduced, which leads to an easy conversion between different manufacturing processes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A universal serial bus (USB) device with a clock calibration function, comprising:
   a first controller, arranged to generate a first operating clock according to a first reference clock;
   a second controller, arranged to generate a second operating clock according to a second reference clock;
   a calibration circuit, comprising:
      a first calibration unit, coupled to the first controller, arranged to generate a first control signal according to the first operating clock; and
      a second calibration unit, coupled to the second controller, arranged to generate a second control signal according to the second operating clock; and
   a selecting circuit, coupled to the first calibration unit and the second calibration unit, arranged to select a target control signal from the first control signal and the second control signal; and
   an embedded oscillator (EMOSC), coupled to the selecting circuit, the first controller, and the second controller, arranged to output the first reference clock to the first controller or output the second reference clock to the second controller according to the target control signal;

wherein during a first phase, a first calibration is performed on the USB device via the first calibration unit in order to control the EMOSC to output the first reference clock to the first controller;

during a second phase, a second calibration is performed on the USB device via the second calibration unit in order to control the EMOSC to output the second reference clock to the second controller.

2. The USB device of claim 1, wherein the first controller is a USB 2.0 controller, and the second controller is a USB 3.0 controller; and the USB device adopts the first operating clock when operating under USB 2.0 mode, and adopts the second operating clock when operating under USB 3.0 mode.

3. The USB device of claim 1, wherein the first phase is an initial phase and the first calibration is a USB 2.0 initial calibration; and the second phase is an on-line phase and the second calibration is a USB 3.0 on-line calibration.

4. The USB device of claim 1, wherein during the first phase, a periodic packet is transmitted from a USB host to the first calibration unit via the first controller in order to calibrate the first reference clock.

5. The USB device of claim 4, wherein the periodic packet is a start of frame (SOF) packet.

6. The USB device of claim 1, wherein during the second phase, a periodic packet is transmitted from a USB host to the second calibration unit via the second controller in order to calibrate the second reference clock.

7. The USB device of claim 6, wherein the periodic packet is an isochronous timestamp (ITP) packet.

8. The USB device of claim 1, wherein the calibration circuit further comprises:

a third calibration unit, coupled to the selecting circuit, arranged to generate a third control signal;

wherein the selecting circuit is further arranged to select the target control signal from the first control signal, the second control signal, and the third control signal;

wherein during a third phase, a third calibration is performed on the USB device via the third calibration unit in order to control the EMOSC to output the first reference clock to the first controller and maintain the first reference clock within a predetermined frequency range.

9. The USB device of claim 8, wherein the third phase is a mass production (MP) phase, and the third calibration is a mass production (MP) calibration.

10. The USB device of claim 1, wherein the selecting circuit is a multiplexer.

11. A method for calibrating reference clocks of a universal serial bus (USB) device, comprising:

using a first controller to generate a first operating clock according to a first reference clock;

using a second controller to generate a second operating clock according to a second reference clock;

generating a first control signal according to the first operating clock;

generating a second control signal according to the second operating clock;

selecting a target control signal from the first control signal and the second control signal;

using an embedded oscillator (EMOSC) to output the first reference clock to the first controller or output the second reference clock to the second controller according to the target control signal;

during a first phase, performing a first calibration on the USB device in order to control the EMOSC to output the first reference clock to the first controller; and during a second phase, performing a second calibration on the USB device in order to control the EMOSC to output the second reference clock to the second controller.

12. The method of claim 11, wherein the first controller is a USB 2.0 controller, and the second controller is a USB 3.0 controller; and the USB device adopts the first operating clock when operating under USB 2.0 mode, and adopts the second operating clock when operating under USB 3.0 mode.

13. The method of claim 11, wherein the first phase is an initial phase and the first calibration is a USB 2.0 initial calibration; and the second phase is an on-line phase and the second calibration is a USB 3.0 on-line calibration.

14. The method of claim 11, further comprising:

during the first phase, calibrating the first reference clock by using a periodic packet transmitted from a USB host via the first controller.

15. The method of claim 14, wherein the periodic packet is a start of frame (SOF) packet.

16. The method of claim 11, further comprising:

during the second phase, calibrating the second reference clock by using a periodic packet transmitted from a USB host via the second controller.

17. The method of claim 16, wherein the periodic packet is an isochronous timestamp (ITP) packet.

18. The method of claim 11, further comprising:

generating a third control signal;

selecting the target control signal from the first control signal, the second control signal, and the third control signal; and during a third phase, performing a third calibration on the USB device in order to control the EMOSC to output the first reference clock to the first controller and maintain the first reference clock within a predetermined frequency range.

19. The method of claim 18, wherein the third phase is a mass production (MP) phase, and the third calibration is a mass production (MP) calibration.

* * * * *

UNITED STATES PATENT AND TRADEMARK OFFICE
CERTIFICATE OF CORRECTION

| | | |
|---|---|---|
| PATENT NO. | : 8,656,205 B2 | Page 1 of 1 |
| APPLICATION NO. | : 13/007663 | |
| DATED | : February 18, 2014 | |
| INVENTOR(S) | : Chun-Liang Chen et al. | |

It is certified that error appears in the above-identified patent and that said Letters Patent is hereby corrected as shown below:

On the Title Page, Item (54) and in the Specification, at Column 1, lines 1-4, correct the title of invention from "Generating reference clocks in USB device by selecting control signal to oscillator form plural calibration units" to --Generating reference clocks in USB device by selecting control signal to oscillator from plural calibration units--.

Signed and Sealed this
Twentieth Day of May, 2014

Michelle K. Lee
*Deputy Director of the United States Patent and Trademark Office*